July 9, 1968

J. N. CARMAN 3,392,312

GLASS ENCAPSULATED ELECTRONIC DEVICES

Filed May 17, 1965

INVENTOR.

JUSTICE N. CARMAN
BY HIS ATTORNEYS
HARRIS, KIECH, RUSSELL & KERN

United States Patent Office 3,392,312
Patented July 9, 1968

3,392,312
GLASS ENCAPSULATED ELECTRONIC DEVICES
Justice N. Carman, Thousand Oaks, Calif., assignor, by mesne assignments, to Carman Laboratories, Inc., a corporation of Massachusetts
Continuation-in-part of application Ser. No. 321,756, Nov. 6, 1963. This application May 17, 1965, Ser. No. 456,458
29 Claims. (Cl. 317—234)

ABSTRACT OF THE DISCLOSURE

A solid state electronic device having a current controlling component to which electrical conductors are attached is enclosed in a glass which is substantially alkali-free, and which has a controlled working temperature and a compatible coefficient of thermal expansion. The glass comprises a glass modifier in a concentration between about 33.3 and about 44 bond percent, substantially the remainder of the glass being glass former consisting of silica and borate. The modifier includes alumina in a concentration between about 5 and about 24 bond percent, and at least one member selected from the group consisting of zinc oxide and cadmia. Beryllia to 19 bond percent may be included in the modifier. The concentration of modifier should not exceed 40 bond percent plus 0.16 times the bond percentage concentration of the silica, which is present in a concentration between about 4 and about 25 bond percent.

---

This application is a continuation-in-part of my copending application entitled, Electronic Devices and Components, Ser. No. 321,756, filed Nov. 6, 1963, now abandoned.

The present invention generally relates to glass and to improved electronic devices and components incorporating glass, and more particularly relates to improved glass compositions for use in protecting solid state electronic devices and to those devices which incorporate said improved protective glass compositions.

In certain solid state electronic devices, the electrical characteristics thereof readily change in response to migration of mobile ions, particularly the alkali metal ions. The movement of such ions typically causes a drift of eectrical characteristics particularly when they collect in the most critical areas of functional surfaces, such as they do in semiconductor diodes and transistors. In other structures where the glass is spaced somewhat away from the critical surfaces, they may become contaminated by the volatilization of the alkali at the time of sealing. Functional surfaces of the various current controlling components must be effectively protected against depreciation of electrical properties by such ions in order to assure reasonable reliability and operating life for the devices. Moreover, the devices must also be protected against thermal and mechanical damage. Various protective means are usually employed to cover the components and at least a portion of the spaced electrical conductor elements associated with the components, and to electrically insulate various elements of the device.

Protective structures in the form of coatings or encapsulations are desirable for most solid state electronic devices, both as individual devices and in assemblies forming circuits of various degrees of complexity. The present invention is directed to the use of glasses in such protective structures where the glass meets a variety of sometimes conflicting requirements. The glass must provide a physical or mechanical isolation, must be free of contaminating ions and other materials which can migrate to the functional surface, must be workable at a temperature low enough to avoid damage to the device, and must have a coefficient of thermal expansion compatible with that of the major elements or bulk of the device. This last requirement usually calls for a lower coefficient than can be obtained in glasses with reasonably low fusing temperatures.

Typical solid state devices to which the invention is applicable include semiconductors in a variety of forms and barium titanate capacitors and other printed, painted and deposited circuit-type devices with one or more layers of conductive paints or insulating glazes or frits, and similar devices wherein an insulating resistive or conductive material includes as a binder the powdered glass or frit which is thermally fused after application, all of which devices may be referred to herein as solid state electronic devices with current controlling components.

Among those electronic devices which incorporate the foregoing components, including some protective means such as encapsulations or the like, are P-N junction type semiconductor devices, including planar types, mesa types and diffused rectifier types. The P-N junctions thereof inevitably terminate at exposed surfaces, and the electrical characteristics of such semiconductors are often limited by the current leakage of such surfaces. Accordingly, the P-N junctions must be thoroughly protected so that they are completely isolated from moisture and foreign ions in order for the devices to retain a stable set of electrical characteristics. Such devices include certain conventional diodes, triodes and the like, rectifiers, variable capacitance devices, transistors, multilayered semiconductor switches such as silicon-controlled rectifiers (SCR) tunnel diodes, field effect transistors, laser diodes and integrated circuitry employing silicon semiconductive components.

In certain electronic devices which employ P-N junction semiconductive components, it is also necessary or desirable to effectively encapsulate the entire device. Most of the devices listed in the preceding paragraph are usually encapsulated. In solar cells, photocells and photovoltaic transducers employing P-N junctions, it is desirable to provide a transparent encapsulation around the entire device.

Moreover, there are a considerable number of solid state devices which do not employ P-N junctions, but which also must be effectively protected by suitable packages or encapsulations. These include metal film resistors, MOS (metal-on-silicon) diodes and transistors, Hall effect parameasuring elements and the like. In addition, thin film resistors, capacitors and inductance spirals require protection to prevent oxidation, corrosion and the like of the thin films, with consequent substantial change in the resistivity of the films.

Plastics have been extensively employed as the primary protective means or "potting" material with solid state electronic devices. Plastics are not completely impervious to moisture or other migrating ions. Therefore, plastic encapsulation generally leaves much to be desired, so that in some devices it has been replaced by hermetic sealing of the ion-sensitive surfaces in gaseous ambients utilizing various packaging materials, particularly glasses. Glass has the advantage of providing improved mechanical protection, and permits operation of the device at higher temperatures with fewer adverse effects than plastic "potting." In some cases, glass must be carefully selected to minimize the danger of contamination of the ion-sensitive surface by components of the glass, such as fluorine, lithium, sodium and potassium.

More recently, improved protection of the ion-sensitive surfaces of silicon devices has been afforded by first "passivating" the sensitive surface, that is, forming an oxide layer on the ion-sensitive surface, and then hermetically sealing the passivated surfaces within conventional welded metal or glass packages. Oxide layers on silicon can withstand the attack of moisture long enough so that they can be sealed hermetically. However, such oxide layers are, in and of themselves, insufficient protection for the ion-sensitive surfaces, since such oxide layers are porous and cannot resist migration of moisture or alkali metal ions into the ion-sensitive layers when electrical fields are applied thereto.

Foreign ions are released during the sealing operation wherein fusion seals are made between the protective glass and the metal components. It appears that these ions are the result of reactions occurring between the glass and metal, particularly at elevated sealing temperatures, and the glass itself is the principal source of the contaminating ions.

Thin layers of glass known as glaze have also been used as protective coverings. They may be fused over the oxide layers used for passivation and if the oxide layers are over 5,000 angstroms thick many types of glass can be successfully used for such purposes. If, however, the oxide layer is thin, of the order of 2,000 angstroms or less, sodium and other mobile ions from the usual types of glass employed as glaze are able to migrate through the oxide layer and into contact with the ion-sensitive surface of the device.

As layers of such charged ions collect near or on the ion-sensitive surfaces in the devices, channels develop that cause radically increased electrical leakage in the devices. Accordingly, silicate or quartz glasses are not very effective as protective coverings for the ion-sensitive surfaces of solid state electronic devices.

Borate type glass is more effective for such purposes since it has a structure distinct from the continuous network type structure of silicate glasses, and is capable of tolerating moderate concentrations of monovalent cations such as sodium, e.g., generally up to 0.1 percent, without exhibiting an increase in electrical conductivity, hydrolysis or migration of the ions. There are three glasses of the borate type which are found to be suitable for the present invention, that is, which meet the requirements of (1) free of alkali metals, (2) sealable at a controllable temperature less than 800° C., (3) relatively inert and not water soluble, and (4) a low and controllable coefficient of thermal expansion. These glasses are oxide glasses and are generally identified herein as glasses A, B and C. Glass A is a new specific zinc borate glass, glass B is a known calcium borate glass sometimes called a "cabal" glass, and glass C is a known lead borate glass. The choice of glass and specific glass composition for use with a particular device will depend upon the materials utilized in the device and some specific examples will be given herein. Previously known glasses have been lacking in desired properties, such as chemical durability and sufficiently low coefficient of thermal expansion; glass A hereof does have these desired properties.

An ideal glass composition for use in protecting a wide range of solid state electronic devices should not only have low electrical conductivity, low dielectric loss, high mechanical and thermal strength, but also should be completely transparent (at least for photoelectric applications) and should not contaminate the ion-sensitive surfaces being protected. Moreover, it should have pronounced resistance to chemical corrosion. Also of considerable importance, it should have a readily controlled coefficient of thermal expansion so that it can closely match that of the surface to which it is to be attached. In certain instances it is also highly desirable that the glass have a controlled working temperature range so as to permit it to be drawn into thin tubing or be applied as a glaze at a safe temperature on the surface to be protected. By controlled working temperature and coefficient of thermal expansion of the glass it is meant that the glass formulation can be readily adjusted to increase or decrease the working temperature and/or coefficient of thermal expansion while substantially preserving other advantageous characteristics of the glass.

Some previously formulated glasses exhibit suitably low electrical conductivity, low dielectric loss, relatively low sealing temperature and low contamination levels. However, they do not have coefficients of thermal expansion sufficiently low to closely match those of semiconductor crystals such as silicon. Moreover, although such glasses exhibit increased chemical resistance over other glasses, their chemical resistance still is not sufficiently good to assure long continued protection of ion-sensitive surfaces in some instances. For example, it may be desirable to apply the glass to the sensitive surface in as thin a layer as is consistent with requisite durability of the device, in order to optimize electrical properties of the device and in order to meet certain physical requirements for the device. An unmodified zinc borate glass reacts with the moisture in the air to form $H_3BO_3$ (hydrate), which is soluble. Accordingly, the strength of the glass decreases and the glass "crazes" or cracks. Such glass is also subject to deterioration upon contact with moisture laden $CO_2$, salt spray and other agents. Accordingly, it is a primary object of the invention to provide improved glass compositions for protecting ion-sensitive surfaces of solid state electronic devices, and improved solid state electronic devices incorporating such glass protective coverings and enclosures.

It is a further object of the invention to provide glass compositions having improved chemical durability, controlled coefficients of thermal expansion and working temperature ranges, high structural strength, and low electrical conductivity and dielectric loss, which render them suitable for use as protective means for the ion-sensitive surfaces of solid state electronic devices.

It is also an object of the invention to provide improved solid state electronic devices having protective glass layers or enclosures which exhibit improved chemical durability, controlled working temperature ranges and coefficients of thermal expansion, low electrical conductivity, low dielectric loss and high structural strength.

It is a still further object of the invention to provide improved glass compositions particularly adapted for use as protective coverings and enclosures for ion-sensitive surfaces of solid state electronic devices, which glass compositions can be readily applied as glazes, or which can be readily drawn into thin tubing for encapsulation purposes.

It is an object of the invention to provide solid state electronic devices having a functional surface sensitive to monovalent ions and including a glass in sealing engagement with at least a portion of the device and with the glass being substantially free of alkali metals and having a controlled working temperature and a controlled coefficient of thermal expansion compatible with that of the major elements of the device. A particular object is to provide such a device incorporating silicon elements including planar type wafers, mesa type wafers and diffused and epitaxially grown rectifier wafers. A further object is to provide such a device incorporating metal-metal oxide capacitors. An additional object is to provide such a device incorporating multi-terminal components including printed circuits and resistive and conductive surfaces. An additional object is to provide such devices wherein the glass may be applied directly to sensitive surfaces and wherein the glass may be mixed with material such as resistive or conductive materials to serve as a binder and wherein the glass may be spaced from the sensitive surfaces.

It is a particular object of the invention to provide an improved solid state electronic device comprising a current controlling component with spaced electrical conductors attached to the component and a glass seal enclosing and spaced from the component and engaging the conductors in sealing relation, with the glass being substantially free of alkali metals and having a controlled working temperature and a controlled coefficient of thermal expansion compatible with that of the conductors.

These and other objects are accomplished in accordance with the present invention by providing an improved glass composition adapted for use as a protective cover or layer for the sensitive surfaces of solid state electronic devices, and by providing improved solid state electronic devices incorporating glass as a protective layer or enclosure for said surfaces. For example, in P-N junction type semiconductors the glass can be applied as a protective layer to the passivated surface of the semiconductive material and terminals and leads thereof. The glass covers the semiconductive material in the region of the exposed P-N junction. The glass may cover the entire passivated surface of the semiconductive material and the parts of the terminals adjacent the semiconductive material. The glass can be drawn into protective tubing of the order of .003 to .020 inch in thickness for partial or full encapsulation of the semiconductor, or can be applied as a glaze of the order of 1–50 microns thickness.

The glass protects the device against surface current leakage and also serves as an effective chemical and mechanical barrier against migration of foreign ions into contact with the passivated surface. The glass is transparent and is characterized by having a low electrical conductivity and low dielectric loss, high mechanical strength, a substantially improved chemical durability over other glasses, improved resistance to thermal shock, a controlled coefficient of thermal expansion and a controlled relatively low working temperature range, in contrast to conventional glass compositions utilized for such purposes.

The new glass (glass A) comprises a zinc borate type composition containing borate, and also zinc oxide and/or cadmia, to which both alumina and silica are added in specific concentration ranges. The glass can also include beryllia, and may further include minor concentrations of additives selected from the group consisting of titania, zirconia, niobia, lanthanum oxide, ceria, scandia, hafnia, gallia, indium oxide and mixtures thereof. All other constituents are excluded from the composition, except in insignificant concentrations, e.g., the glass can tolerate up to about 0.1 percent sodium, etc. The composition is resistant to devitrification over a wide temperature range and exhibits complete miscibility of constituents.

As a specific example, a zinc borate type glass has been prepared which has a coefficient of thermal expansion, in the range of 0°–300° C., of $38 \times 10^{-7}/°$ C. so that it closely matches the coefficient of thermal expansion of a silicon semiconductor wafer ($35 \times 10^{-7}/°$ C.) for the same temperature range. This composition has a working temperature of about 770° C. The glass consists of between about 22 and about 25 bond percent of silica, between about 32 and about 38 bond percent of borate, between about 12 and 20 bond percent of alumina, the balance being zinc oxide. This composition has been applied as a glaze of 1–50 microns thickness to the 40 A. thick thermally grown silica surface (chemically passivated) of a silicon wafer junction type diode. The terminals and leads of the diode comprised molybdenum. The finished, protected diode exhibited improved durability and resistance to mechanical, chemical, and thermal deterioration.

Further objects and advantages of the invention are set forth in the following detailed description and the accompanying drawings of which.

Figure 1:
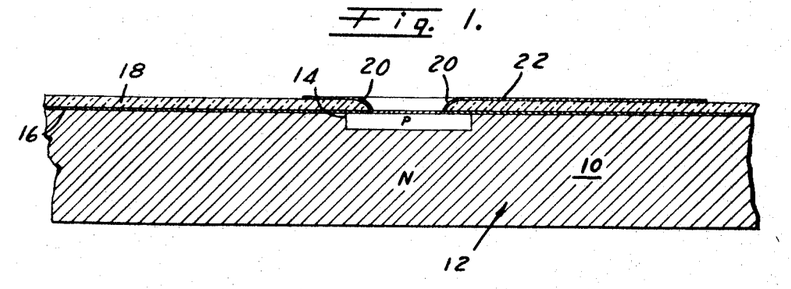
FIG. 1 is a schematic cross section of one embodiment of a solid state electronic device in accordance with the invention, said device containing a protective covering of the glass of the invention.

One embodiment of the improved solid state electronic device of the invention is schematically illustrated in FIG. 1 in cross section. The particular device depicted is a diode 10 which includes a silicon semiconductor crystal 12. The crystal 12 has a P-N junction 14 and a passivation layer 16 of silica to which is sealed a thin glaze 18 of the glass of the invention. The glaze 18 and passivation layer 16 are etched away in the area 20 in which area an electrically conductive layer 22 of evaporated and alloyed aluminum is bonded directly to the P side of the junction 14. The N side of the junction 14 may be connected to another electrical conductor (not shown). The composition of the glass of the invention is controlled so that it has a coefficient of thermal expansion which closely matches that of the crystal 12. The method of manufacture of the device, exclusive of the glaze covering 18, is conventional in the semiconductor art and, accordingly, will not be described.

It will be understood that the solid state electronic devices of the invention can be one of any suitable size, shape and construction consistent with the desirability of applying a layer or enclosure of the protective glass of the invention thereto. Thus, the invention includes any solid state electronic device having a current controlling region sensitive to the migration of mobile ions thereto and collection of such ions at certain points thereon, which device also includes means for electrically conducting current to and from the current controlling region and means for electrically insulating the device. Such device further has a glass such as the glass composition of the invention as a protective covering or enclosure for the passivated or unpassivated surface of the current controlling region.

The glass composition of the invention can be applied to the solid state electronic device in any suitable manner. For example, a thin preformed tube of about .003–.020 inch in thickness of the glass can be slipped over a passivated silicon P-N junction simiconductor wafer and the adjacent periphery of attached electrically conductors so as to cover the exposed passivated portion of the P-N junction and adjacent parts of the conductors. The assembled parts may then be heated to a temperature above the softening point of the glass for a period of time sufficient to fuse the glass to the conductors, for example to about 750° C. for about 5 minutes. This sealing operation may be performed in a controlled atmosphere with the choice of sealing atmosphere depending primarily upon the particular materials utilized in the various elements.

The exposed passivated P-N junction must be covered and sealed to the glass, and it is desirable that the sealed area also include the remainder of the surface of the crystal, as well as an appreciable proportion of the adjacent area of the attached terminals. However, particular semiconductor and other solid state devices may, in accordance with the invention, require or desirably have different and/or larger or smaller areas sealed in the protective glass layer.

It will be understood that the protective glass layer also can be applied to the ion-sensitive surface or passivated surface of the solid state electronic devices and associated conductors as a thin glaze of about 1–20 microns in thickness.

When applying glazes, an alternative procedure similar to that described but using an air-containing furnace can also be employed and in most instances is preferred, in that it is slightly easier to carry out. For example the following typical glazing procedure has been successfully carried out: Glass (first ground in a ball mill) can be suspended in an organic solvent such as isopropanol. The heavy particles tend to settle out, leaving the "fines" in suspension. This separation by settling can be accelerated by centrifuging. In any case, a certain volume of the suspension may be placed in a centrifuge cup along with a silicon wafer on which diffused junctions exist. During centrifuging the glass first settles onto the silicon surface and is compacted against it. After decanting the solvent off, the wafer is then placed in an air-containing furnace and the glass is fused to the wafer. This technique is applicable to the device 10 illustrated in FIG. 1. After such fusing, the area 20 can be etched out of the glass 18 in a conventional manner and the conductor 22 can be joined to the exposed P portion of the junction, as by a metal evaporation technique.

Figures 5, 6, 7, 8, 9, 11, 12:
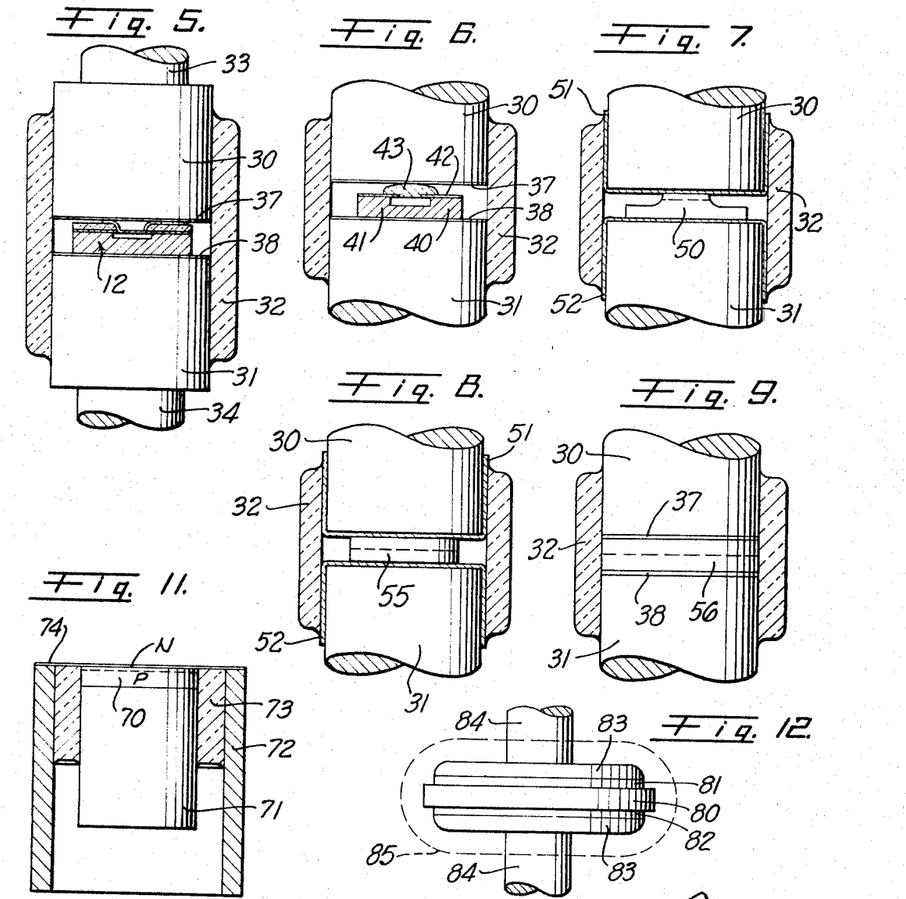
FIG. 5 illustrates the device of FIG. 1 in a completely assembled component.
FIGS. 6, 7, 8 and 9 illustrate an assembled component of the type of FIG. 5 with planar type, mesa type and two diffused rectifier type chips or wafers, respectively.
FIG. 11 is a schematic cross section of another embodiment of a solid state electronic device having a pair of terminals at one end thereof.
FIG. 12 is a side view of a capacitor embodiment of the invention.

Another embodiment of the invention is shown in FIG. 5. Here the crystal wafer 12 of FIG. 1 is mounted between pins 30, 31 and enclosed within a glass bead or tube 32 to form a diode component with leads 33, 34.

In a typical unit, the pins 30, 31 may be nickel-plated molybdenum or tungsten with layers 37, 38 of a silver or silver alloy on the inner ends thereof. The leads 33, 34 may be tinned copper which are silver soldered to the respective pins 30, 31. The glass bead 32 may be formed of one of the glasses described herein. The unit may be assembled in the manner described above. During the heating operation for the glass sealing, the silver alloy layers 37, 38 will melt providing an electrical contact with the upper and lower surfaces of the crystal 12.

The coefficient of thermal expansion of silicon is about $35 \times 10^{-7}/°C.$, the coefficient of molybdenum is about $50 \times 10^{-7}/°C.$ and for tungsten about $45 \times 10^{-7}/°C.$ When molybdenum or tungsten pins are utilized, the glass of which the bead 32 is formed desirably should be of the A glass type having a coefficient between these two, such as about $40-45 \times 10^{-7}/°C.$ In structures where the physical size of the silicon crystal is quite small, it is sometimes possible to ignore the temperature expansion of the silicon and utilize other materials for the pins which comprise the bulk of the device. The Dumet metals are available with coefficients of thermal expansion in the range of 65 to $100 \times 10^{-7}/°C.$ The B glasses and C glasses are particularly suitable for these metals, having matching coefficients. It should be noted that in most situations, the B glasses and C glasses cannot be applied directly to a semiconductor surface as illustrated in FIG. 1 because the coefficient of thermal expansion of these glasses is much greater than that of the semiconductor material.

FIG. 6 shows an alternative form of diode utilizing a planar wafer 40. The glass layer 18 of the crystal wafer 12 of FIG. 5 is omitted. The wafer 40 comprises a silicon crystal 41 which may have a silicon oxide passivating layer 42 and a silver button terminal 43 which contacts the semiconductor 41 through an opening in the layer 42.

FIG. 7 illustrates another form utilizing a mesa type wafer 50. This figure illustrates another method of forming the electrical contacts with the wafer. Instead of the alloy layers 37, 38 the inner ends of the pins 30, 31 are plated with films 51, 52 of a high conductivity metal such as silver, rhodium, or gold or sometimes nickel or chromium. Pressure contacts are made between the pins and the wafer, with the glass bear 32 serving to hold the assembly together and maintain the pressure.

FIG. 8 shows another alternative form utilizing a silicon diffused rectifier wafer 55 spaced from the bead 32, and FIG. 9 shows another structure with a rectifier wafer 56 substantially the diameter of the pins 30, 31. Various other solid state electronic devices may be encapsulated or sealed in a similar manner.

Figure 10:
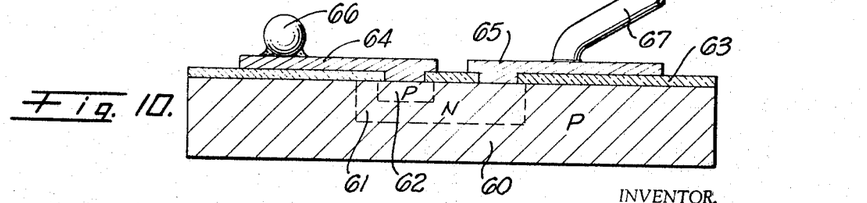
FIG. 10 is a schematic cross section of another embodiment of a solid state electronic devices having more than two terminals.

FIG. 10 is a sectional view through a solid state device illustrating the use of the glass with a multiterminal device such as a three-terminal semiconductor. A P type silicon crystal 60 has an N type zone 61 therein with another P type zone 62 in the N type zone 61. A layer 63 of glass is applied over the upper surface of the crystal, either directly onto the semiconductor material or onto a passivation layer formed on the crystal. The layer 65 may be applied in the same manner as the layer 18 of FIG. 1. Openings are provided in the glass layer 63 permitting conductors 64, 65 to make contact with the zones 62, 61, respectively. Typically the conductors 64, 65 are evaporated aluminum films. Circuit connections can be made to the terminals in various conventional manners as by soldering a metal contact ball or stud 66 or by a compression bond with a conductor 67. This type of structure is particularly adapted for use with transistors and integrated circuits.

FIG. 11 illustrates another form particularly adapted for use as a photodiode. A semiconductor wafer 70 in the form of a disc of P type silicon with an N type zone on one face thereof is mounted on a conductive pin 71, as by soldering. The pin 71 is concentrically fixed within a cylindrical conductor 72 with a glass 73. A very thin conductive layer 74 is applied to the flat upper surface of the structure to provide an electrical path between the top surface of the wafer and the outer terminal 72 and to provide a protective layer for the upper surface of the wafer 70. Typically the layer 74 may be an optically transparent evaporated film of gold. As in the other embodiments described, the glass 73 is one of the glasses described herein selected to have a coefficient of thermal expansion compatible with that of the semiconductor and the conductor materials. In this particular embodiment where the glass directly contacts the semiconductor, glass A is preferred.

Typical of ceramic applications of the invention is the capacitor illustrated in FIG. 12. A wafer 80 of barium titanate type material serves as the dielectric. Of course a wide variety of compositions are used as dielectrics and are included herein under the expression "titanate ceramic." The capacitor plates 81, 82 are conductive glazes applied as a paste of glass frit and metal powder or flake, usually silver or gold, and fired at a relatively high temperature, typically 600–700° C. A layer of solder 83 is then applied to each plate and tinned copper leads 84 are attached. The device may be potted in an epoxy 85 if desired. Similar construction is used in applying conductive coatings to ceramics in ultrasonic generators and transducers and in other devices utilizing ceramics. Conductive and resistive glazes are used similarly in printed circuitry, such as the cermet circuits where conductors and resistors in the formal glass-metal parts are fired in place on substrates, typically of alumina. Conductive and/or resistive glaze layers may be separated by insulating glaze layers and the completed circuit may be covered by an insulating glaze, which could be glass frit with no conductive or resistive material. Of course, each layer of glaze will have a lower melting point than the preceding layers.

It has been found that migration of ions from the glass or glaze to the ceramic occurs in such devices and a deterioration in performance results. A glass for use in these devices must have a coefficient of thermal expansion matching that of the ceramic or substrate. The glass should also be free of contaminating ions. The glass best suited for each device can be selected based on the particular materials used. For example, glass B is preferred for the glaze for the barium titanate capacitor of FIG. 12 since it can be made with an expansivity substantially the same as that of the titanate.

The basic glass composition of the invention (glass A) is a zinc borate type glass containing a homogeneous solution of borate ($B_2O_3$), alumina ($Al_2O_3$) and silica ($SiO_2$) in controlled concentrations to which can be added, as desired, beryllia (BeO) in controlled amounts. The basic glass also contains controlled concentrations of zinc oxide (ZnO) and/or cadmia (CdO). Moreover, minor amounts of additive selected from the group consisting of zirconia, niobia, molybdena, tungsten oxide, yttria, lanthanum oxide, ceria, scandia, hafnia, gallia, indium oxide, titania, and mixtures thereof, can be added to the basic glass composition. Impurities such as sodium (up to 0.1 percent), etc., are undesired but are tolerated in individual and collective concentrations which are insufficient to have an appreciable effect on the basic properties of the glass. Thus, impurities should not be present in any more than very minor or trace concentrations.

Each constituent of the glass is completely dissolved and uniformly distributed therein. The glass is resistant to devitrification over a wide temperature range and is equally adapted for use as thin tubing or a thin glaze for the protection of the current controlling region of solid state electronic devices and also, if desired, protection of input and output terminals or other electrical conduction means connected to or associated with such current controlling region.

The silica and borate in the basic glass constitute the glass former, while the zinc oxide and/or cadmia, the alumina and the beryllia (if present) constitute the glass modifier. The glass modifier is present in the basic glass in a concentration of between about 33.3 and about 44 bond percent, while the glass former constitutes the remainder of the basic glass. The previously described additives can be added in minor amount to this basic glass, if desired. The alumina is present in a concentration in the basic glass of between about 5 and about 24 bond percent. The concentration of the beryllia does not exceed twice the sum of the concentrations of the zinc oxide and cadmia. The beryllia concentration is from 0 to about 19 bond percent in the basic glass. The cadmia can be substituted for the zinc oxide, so that glass compositions which contain cadmia but not any zinc oxide, as well as those which include both zinc oxide and cadmia and those which contain zinc oxide but not any cadmia are part of the present invention. The silica is present in the basic glass in a concentration of between about 4 and about 25 bond percent, while the borate concentration consists of the remainder of the basic glass.

It has been found that in addition to the above-described critical relationship between the beryllia, and the cadmia and zinc oxide there is also a critical relationship between the total concentration of the glass former and that of the silica. In this regard, in the glass composition of the present invention, the combined concentration of glass modifier (alumina, zinc oxide, beryllia and cadmia) does not exceed 40 bond percent plus 0.16 times the bond percentage concentration of silica, for reasons more particularly set forth hereinafter.

All the above ranges and limits for the zinc oxide, alumina, silica, borate, beryllia and cadmia are for the basic glass composition exclusive of additives. Within the described range of concentrations of the glass composition of the invention there are preferred individual glass compositions and ranges of compositions which exhibit maximization of certain of the improved properties of the glass and which are particularly adapted for selected uses of the glass, as more particularly set forth hereinafter.

Figure 2:
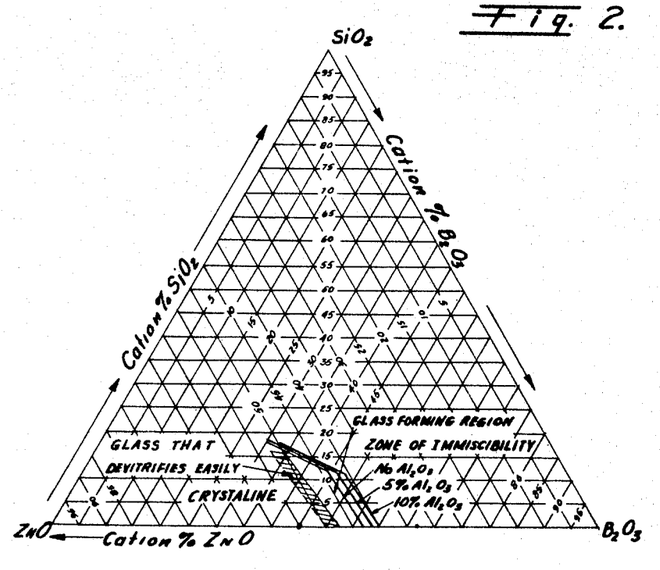
FIG. 2 is a phase diagram illustrating the glass-forming region for zinc oxide-silica-borate-alumina-containing glasses in accordance with the invention, the constituents of the glass being depicted in cation percentages.

It will be noted that the above percentages specified in the glass composition of the present invention are bond percentages rather than cation percentages. The conversion from cation percent to bond percent simply consists of multiplying each cation percent value by the cation valence and then dividing this product by the sum of all the products (cation percent×valence) in the particular composition. It has been found necessary to express the concentrations of the components of the glass in bond percentages in order to accurately delineate the glass-forming region for the glass composition of the invention. This is clearly illustrated by comparing FIGS. 2 and 3 of the accompanying drawings. In FIG. 2, a triangular coordinate phase diagram is depicted wherein silica, borate and zinc oxide concentrations are plotted against each other in cation percentages. When alumina is substituted for a portion of the zinc oxide (alumina substituting at 5 cation percent and 10 cation percent levels) a plurality of sets of immiscibility limits and devitrification limits result, one set for each concentration of alumina. Accordingly, using cation percent, a single set of immiscibility and devitrification limits defining the desired glass-forming region cannot be obtained, where alumina is substituted for zinc oxide in various concentrations in the formulation.

Figure 3:
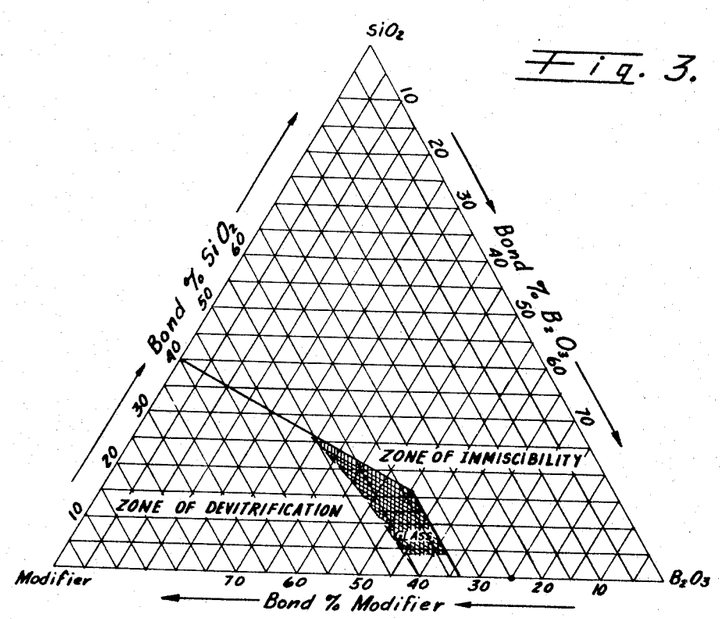
FIG. 3 is a phase diagram illustrating the glass-forming region set forth in FIG. 2, but with the constituents of the glass depicted in bond percentages.

However, as shown in FIG. 3, when the cation percentage values of the constituents are converted to bond percentage values, alumina can be directly substituted for a portion of the zinc oxide, as can beryllia, and cadmia can also be substituted for zinc oxide, so that the resulting glass modifier can be plotted as if it were all zinc oxide, whereby a single set of immiscibility and devitrification limits is provided which clearly defines the glass-forming region for the zinc oxide-borate-alumina-silica-quaternary system, and for the zinc oxide-borate-alumina-silica-beryllia-cadmia system. The zone of immiscibility is now defined by a single line, as is the zone of devitrification. It has been found that it is only within the portion of the glass-forming region indicated in FIG. 3 that is bounded at the lower end thereof by a minimum concentration of 4 bond percent of silica that satisfactory glass compositions exhibiting the required characteristics can be prepared.

The following sample calculation indicates the manner in which cation percent can be readily converted to bond percent for a sample composition containing the following cation percentage concentrations of constituents:

| Constituents | Cation Percent | Bond Percent |
|---|---|---|
| Silica | 11.0 | 15.74 |
| Borate | 46.6 | 50.00 |
| Alumina | 11.0 | 11.80 |
| Zinc oxide | 31.4 | 22.46 |

The 11.0 cation percent of silica is converted to its equivalent bond percentage by the following calculation:

$$\frac{11.0\times 4}{(11\times 4+46.6\times 3+11\times 3+31.4\times 2)}=\frac{44}{297.6}=15.74$$

bond percent of silica.

A similar calculation can be made with respect to the 46.6 cation percent of borate. Its equivalent bond percentage is 50.00 bond percent. Conversion of 11.0 cation percent of alumina to bond percent equals 11.8 bond percent and conversion of 31.4 cation percent of zinc oxide equals 22.46 bond percent. The zinc oxide, alumina, beryllia and cadmia can now be directly substituted for one another, within the described limits, on a bond percent basis. So also can silica and borate be substituted for each other.

It is necessary to modify pure zinc borate glass in order to obtain the required chemical durability and other characteristics of the present glass. Pure zinc borate glass is of little or no use for the protection of ion-sensitive surfaces of current controlling materials because it devitrifies very easily, is attacked by atmospheric moisture and has such an extremely short working range that it cannot be effectively worked into suitable shapes. Silica has been added in past to zinc borate glass in an attempt to improve certain properties, particularly chemical durability. However, many of the reported silica zinc borate glass compositions fall into the region of immiscibility so that homogeneous compositions are not obtained.

Figure 4:
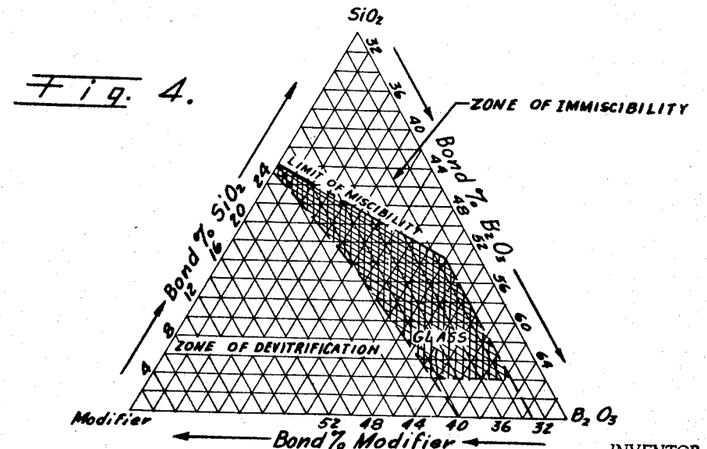
FIG. 4 is an enlarged phase diagram of the glass-forming region of FIG. 3.

It is only with the use of a quaternary glass system employing alumina as well as silica, borate and either zinc oxide or cadmia, or both, that devitrification of the glass can essentially be eliminated and the chemical durability of the glass can be adequately increased. Moreover, such glass at selected concentrations of constituents exhibits a sufficient increase in the range of the temperatures at which the glass can be worked to allow tubing to be readily drawn from the glass. The concentration range of the glass modifier which is necessary to establish a significant reduction in the tendency of the glass to devitrify and to obtain substantial increases in working range and chemical durability, hardness and strength extends between 33.3 and 40–44 bond percent, depending on the silica concentration, as shown in FIGS. 3 and 4. The basic glass modifier includes zinc oxide and/or cadmia, and alumina, and can additionally contain beryllia.

The lower limit of alumina concentration is fixed by the lowest concentration which exerts an appreciable improvement on both chemical durability and resistance to devitrification of the glass. This lower limit for alumina is 5 bond percent. The maximum bond percentage of alumina which can be substituted for zinc oxide is about 24 bond percent. Beyond 24 bond percent concentration, the tendency of the alumina to cause the glass to devitrify and to increase its liquidus temperature defeats the advantages of introducing alumina into the glass. For most purposes, a preferred range of concentration for the alumina is between about 8 and about 16 bond percent. In this region, the alumina has maximum effectiveness in that it almost eliminates the tendency of the glass to devitrify, and it substantially increases the working range of the glass and improves the chemical durability, hardness and strength thereof without substantially increasing the working temperature or adversely affecting any of the other useful properties of the glass composition. Beyond about 16 bond percent and up to about 24 bond percent the additional concentration of alumina in this glass does not substantially impair the desirable characteristics of the glass but does not contribute any further improvement to the glass.

Beryllia in a concentration of up to about 19 bond percent can be substituted for zinc oxide and/or cadmia in the glass, provided, however, that the beryllia concentration in bond percent does not exceed twice the sum of the zinc oxide and cadmia concentrations in bond percent. This is to preserve the integrity and advantages of the zinc borate type system. Within the described range of concentrations, the beryllia increases the working range (viscosity) and the structural strength of the glass. No further benefit is derived from the beryllia beyond about 19 bond percent.

Cadmia can be substituted for a portion or all of the zinc oxide on a bond percentage basis and has the advantage of increasing the coefficient of thermal expansion of the glass so that such coefficient can be adjusted to a desired range for a particular purpose. Coefficients of thermal expansion as high as $62 \times 10^{-7}/°$ C. can be obtained by substituting up to about 24 bond percent cadmia for zinc oxide. From 5 to 8 bond percent of cadmia has the effect of reducing the working temperature of the glass by about 15° to 25° C. However, high concentrations of cadmia have a deleterious effect on the chemical durability of the glass so that the cadmia concentration is kept to a minimum consistent with coefficient of thermal expansion requirements.

Silica is directly substituted for borate on a bond percentage basis, within specified limits, and has the effect of reducing the tendency of the glass to devitrify even when the silica concentration is as low as 4 bond percent. Lower concentrations of silica are generally insufficient to have an appreciable beneficial effect. Silica also has the effect of lowering the working temperature of the glass composition when present in a moderate concentration. For example, when silica is present at the 5 bond percent level, the working temperature of the glass is reduced by about 15° C. In applications where a minimum glass working temperature is desired, the silica is preferably present in a concentration of between about 5 and about 8 bond percent. Although the glass working temperature is increased by about 35° C. above the minimum (exhibited at 5–8 bond percent) when 17 bond percent of silica is present, the chemical durability is greatly increased, while the tendency of the glass to devitrify is greatly reduced and the coefficient of thermal expansion is also lowered. Above about 17 bond percent silica, there is no further improvement in chemical durability, although the coefficient of thermal expansion continues to decrease and the glass working temperature increases. Even at the upper limit of concentration for silica, 25 bond percent, and at the limit of miscibility, essential properties of the glass are not impaired and the coefficient of thermal expansion is very low ($38 \times 10^{-7}/°$ at 0–300° C.). The working temperature of the glass at such limit is 800° C., in contrast to 657° C. for a glass having 15 bond percent of silica and 640° C. for a glass having 5 bond percent of silica. The higher working temperature is advantageous in selected applications, particularly where it is desired to lay down successive compatible layers of glass with interconnecting electronic circuitry disposed therebetween.

The total concentration of glass modifier cannot exceed 40 bond percent plus 0.16 times the bond percent concentration of silica. If this upper limit is exceeded, the composition tends to devitrify. This can be seen from FIGS. 3 and 4, wherein it will be noted that the zone of devitrification is defined by a line which has a slope so that the line extends from 40 bond percent modifier at 4 bond percent silica to 44 bond percent modified at 25 bond percent silica.

The borate ($B_2O_3$) of the zinc borate-containing glass of the present invention comprises the remainder of the basic glass composition. The borate concentration will vary, depending on the concentrations of other above-described constituents, usually between about 31 and about 63 bond percent, but is preferably present in a concentration of between about 32 and about 54 bond percent. A substantial percentage of borate as well as zinc or cadmia is necessary to preserve the basic characteristics and integrity of the glass. In the preferred range of concentrations for the borate, the silica concentration is in excess of 24 bond percent, a preferred concentration range for the silica.

Also in accordance with the present invention, selected additives can be added to the basic glass composition, as described. Such additives are optional and comprise zirconia ($ZrO_2$), niobia ($Nb_2O_5$), molybdena ($Mo_2O_5$), tungsten oxide ($WO_3$), yttria ($Y_2O_3$), lanthanum oxide ($La_2O_3$), ceria ($CeO_2$), scandia ($Sc_2O_3$), hafnia ($HfO_2$), gallia ($Ga_2O_3$) and indium oxide ($In_2O_3$). These additives may be present singly or in any mixture in the glass and up to a sum total maximum concentration of about 2 bond percent of the final product (basic glass plus additives). Thus, the basic glass composition plus the additives, if any, constitute the final product. Titania ($TiO_2$) can also be added in like manner up to a total of about 5 bond percent concentration, based on the final product, not the basic glass composition. However, the maximum permissible sum total concentration of a mixture of the additives including the titania, is also 5 bond percent, i.e., up to 2 bond percent of the first group of additives, plus up to 3 bond percent of titania. All of such additives exert minor specialized and selective influence on certain properties of the glass and have been found to be technically unobjectionable, since they do not interfere with the electrical properties thereof.

It also has been found that other oxides which have previously been added to other zinc borate glasses, such as lead oxide (PbO), magnesia (MgO), germania ($GeO_2$) and the like are objectionable in the present glass system. In this regard, lead oxide seriously depreciates the chemical durability of the glass composition and also substantially increases the coefficient of thermal expansion of the glass. Magnesia, in the presence of substantial amounts of alumina, for example, concentrations of alumina in excess of 6 bond percent, forms the compound $MgAl_2O_4$ which precipitates from the glass and is therefor highly objectionable. Germania is also objectionable in that it increases the expansivity of the glass and its cost, and also reduces chemical durability while failing to materially contribute beneficial characteristics.

Accordingly, the present glass composition is limited to the previously described constituents and concentration ranges and limits, so that each specific glass composition defined thereby has the improved chemical durability, hardness, low electrical conductivity and dielectric loss, and controlled expansivity and working temperature to render it highly suitable for use in preparing improved protected solid state electronic devices.

The glass composition can be prepared from essentially pure oxides utilizing any suitable technique which maintains the purity of the glass and assures complete solution and uniform distribution of all constituents in the glass. For example, a 15 kw. furnace employing 8 silicon carbide heaters in mullite protection tubes can be employed. The glass can be held in a platinum liner which fits into a ceramic crucible, the liner being covered by a platinum lid. In order to make a batch of the glass, the oxides are weighed directly into the liner until the liner is filled. The lid is then closed, and the closed liner while disposed in the ceramic crucible is placed in the furnace. A platinum gas inlet directs a flow of gas such as argon so that it bubbles through the melt whereby contamination from the furnace wall is minimized and agitation of the melt is effected. At about 1350° C. to 1375° C. all the oxides dissolve and the glass is very fluid. The 1350–1375° C. temperature is usually reached by the glass itself in about 3 hours. The glass then can be maintained at this temperature for about 2 to 4 more hours, whereupon it is quenched by pouring it into a massive aluminum trough, and is allowed to cool to ambient temperature.

Certain preferred individual glass compositions and glass composition ranges within the described range of glass compositions of the invention provide certain especially enhanced properties. All of such compositions are hard and strong and have electrical resistivity in excess of $10^8$ ohm-cm. at 600° C. Thus, when it is desired to maximize chemical durability and still have as low a working temperature as possible, the following composition is prepared, as by the above-described technique.

| Components: | Concentration—bond percent |
|---|---|
| Silica | 16.5 |
| Borate | 50 |
| Alumina | 10–12 |
| Beryllia | 0–6 |
| Zirconia | 1 |
| Titania | 1 |
| Zinc oxide | Balance |

A particularly preferred glass composition having a low coefficient of thermal expansion of the order of $40 \times 10^{-7}$/° C., a low working temperature of about 670° C. and enhanced chemical durability comprises the following:

| Components: | Concentration—bond percent |
|---|---|
| Silica | 16.5 |
| Borate | 49.5 |
| Alumina | 10 |
| Beryllia | 0–6 |
| Cadmia | 0–4 |
| Zinc oxide | Balance |

A particularly suitable set of glass compositions having a minimum working temperature of about 628° C. and a low coefficient of thermal expansion of $45 \times 10^{-7}$/° C. comprises the following:

| Components: | Concentration—bond percent | |
|---|---|---|
| Silica | 4–8 | 62–66 |
| Borate | 54–62 | |
| Alumina | 5–8 | |
| Cadmia | 5–8 | |
| Zinc oxide | Balance | |

Glass compositions which exhibit minimal coefficients of thermal expansion ($38 \times 10^{-7}$/° C.) closely matching that of silicon semiconductor crystals ($36 \times 10^{-7}$/° C.) and moderate working temperatures comprise the following:

| Components: | Concentration—bond percent |
|---|---|
| Silica | 22–25 |
| Borate | 32–38 |
| Alumina | 16–20 |
| Zinc oxide | Balance |

Glass compositions which have high coefficients of thermal expansion which closely match those of germanium and gallium arsenide semiconductor crystals ($60-62 \times 10^{-7}$/° C.) and low melting points (about 640° C.) comprise the following:

| Components: | Concentration—bond percent |
|---|---|
| Silica | 16 |
| Borate | 50 |
| Alumina | 6–10 |
| Cadmia | 20–24 |
| Zinc oxide | Balance |

Glass compositions particularly adapted for glazing beryllia ceramic semiconductors and the like comprise the following:

| Components: | Concentration—bond percent | |
|---|---|---|
| Silica | 14–16 | 66.5 max. |
| Borate | 50–52 | |
| Alumina | 5 | |
| Beryllia | 12–18 | |
| Zinc oxide | Balance | |

The following specific glass compositions further illustrate compositions of the invention which have the improved chemical, mechanical and thermal properties afforded by the glass of the present invention:

| Composition No. | A | B | C | D | E | F | G | H | I | J | K |
|---|---|---|---|---|---|---|---|---|---|---|---|
| Constituents: | | | | | | | | | | | |
| Silica | 24 | 16 | 16 | 16 | 6 | 6 | 6 | 6 | 6 | 16 | 16 |
| Borate | 34 | 50 | 50 | 44 | 60 | 60 | 60 | 60 | 60 | 50 | 50 |
| Alumina | 12 | 12 | 20 | 12 | 12 | 6 | 6 | 6 | 5 | 5 | 12 |
| Zinc Oxide | 30 | 22 | 14 | 28 | 22 | 28 | 22 | 22 | 10 | 10 | |
| Beryllia | | | | | | | 6 | | 19 | 19 | |
| Cadmia | | | | | | | | 6 | | | 22 |
| Work Temp. (° F.) | 800 | 670 | 680 | 670 | 650 | 640 | 650 | 625 | 670 | 670 | 640 |
| Coefficient of Thermal Expansion (0–300° C.) 10⁻⁷/° C. | 38 | 41 | 40 | 41 | 44 | 45 | 44 | 47 | 44 | 40 | 60 |
| Chemical Durability (Rating 0–8) | 7 | 7 | 7 | 7 | 6 | 5 | 5 | 5 | 6 | 8 | 6 |
| Resistivities (ohm-cm. at 600° C.) | $>10^8$ | $>10^8$ | $>10^8$ | $>10^8$ | $>10^8$ | $>10^8$ | $>10^8$ | $>10^8$ | $>10^8$ | $>10^8$ | $>10^8$ |

Chemical durability was determined by the following test: the glass sample was masked over a portion of its surface and the remaining surface was subjected to attack by boiling it in water at atmospheric pressure for 1 hour. Thereafter, the sample was removed and dried, and the height of the step formed between the masked area and the attacked area was measured with a profilometer. Those glass samples exhibiting a step height of less than 1000 A. were given a rating of 8, indicating little corrosion, while those glass samples exhibiting a step height of at least 10,000 A. were given a rating of 0, indicating a very low resistance to corrosion. Intermediate values were proportional between these extremes. A value of 5 (indicating a height of 4000 A. or better) indicated a substantial improvement in chemical durability.

The preceding examples clearly demonstrate that the glass compositions of the invention (glass A) have improved chemical durability, controlled working temperatures and coefficients of thermal expansion, hardness and suitable low electrical conductivity. Such compositions can be easily prepared and can be easily incorporated as protective layers into solid state electronic devices of the invention. Such devices exhibit extended operating life and improved performance, without failure due to cracking or separation of the glass layer from either the ion-sensitive surface or electrical conductors to which they have been sealed. Devices fabricated in accordance with the invention can withstand thermal cycling between +300° C. and −195° C. in 2 seconds and can be stored at temperatures up to 500° C. without damage. They are also highly resistant to mechanical shock. Accordingly, they are chemically, mechanically, and thermally durable. Their improved properties are attributable to the present mechanically strong, chemically durable, thermally resistant glass which closely matches the coefficient of thermal expansion of the ion-sensitive surfaces and electrical conductors thereof. Accordingly, the devices and glass composition of the invention exhibit substantially improved properties. Further advantages of the invention are as set forth in the foregoing.

Glass B, the cabal glass family, is a borate ($B_2O_3$) glass having alumina ($Al_2O_3$) as an essential modifier and in addition one or more of calcium oxide (CaO), strontium oxide (SrO) and barium oxide (BaO) as a modifier. The glass is improved by the addition of silica ($SiO_2$), but silica is not essential. The range of suitable compositions is best expressed in cation percent or in ratios, rather than in bond percent because the cabal glasses contain continuous networks or chains of glass formers, in contrast to the zinc borate glasses which do not. The cabal glasses are known and the constituents may be combined about in the range defined by the ratios $$1:3 \geq SiO_2 : BO_{1.5} \geq 0:1$$

$$2:1 \geq AlO_{1.5} : X \geq 1:2$$

$$4:1 \geq (BO_{1.5} + SiO_2) : (AlO_{1.5} + X) \geq 1:1$$

where X is at least one of CaO, SrO and BaO.

One specific composition preferred for glass-to-metal seals matching tantalum is $$SiO_2 : BO_{1.5} = 1:4$$

$$AlO_{1.5} : CaO = 4:3$$

$$(BO_{1.5} + SiO_2):(AlO_{1.5} + CaO) = 1:1$$

The coefficient of thermal expansion of this composition is about $65 \times 10^{-7}/°$ C. and its softening temperature lies between 650 and 700° C.

The zinc borate family (glass A) and the calcium borate or cabal family (glass B) cover the full range of expansivities needed and all can be sealed between 600 and 750° C. The lead borate family (glass C) does not cover the complete range of coefficient of thermal expansion, being limited to about 85 to $140 \times 10^{-7}/°$ C. However, the lead borate family glasses can be sealed between 400 and 600° C. and are useful in some applications. Glasses A and B have the advantages of improved chemical durability and reduced tendency to react with substrate ceramics such as barium titanate, and can be worked in a neutral or reducing atmosphere whereas the lead borates cannot. However, where the low fusing point is essential, the lead borates are uniquely useful in the present invention.

As with the cabal glasses, the range of suitable compositions for the lead borate family is better expressed in cation percent rather than in bond percent. The lead borate glass is known. In the glass former, the borate ($B_2O_3$) should be between about 30 cation percent and about 50 cation percent and the silica ($SiO_2$) should be between about 4 cation percent and 25 cation percent, preferably at about 10 to 12 cation percent. The total of borate and silica should not exceed about 60 cation percent. In the modifier, the alumina ($Al_2O_3$) should be between about 5 cation percent and about 30 cation percent, preferably at about 15 to 25 cation percent, with the remainder lead oxide (PbO). An increase in borate results in increased expansivity, however, the other parameters are relatively constant. Addition of silica tends to increase the sealing temperature rapidly but also improves the chemical durability and reduces the tendency to devitrify and reduces the coefficient of thermal expansion.

One specific composition preferred for its low sealing temperature is, in cation percent, $SiO_2$ 10, $B_2O_3$ 34, $Al_2O_3$ 16 and PbO 40. This composition has a coefficient of thermal expansion of about $88 \times 10^{-7}/°$ C. and a softening temperature of about 420° C.

Various modifications, changes and substitutions can be made in the glass compositions and devices of the invention and all such modifications, changes and substitutions which are within the scope of the appended claims form a part of the invention.

What is claimd is:

1. An improved solid state electronic device comprising an ion-sensitive current controlling component having a passivating layer of oxide on an exposed surface thereof, spaced electrical conductors attached to said component, and a glass in sealing engagement with said passivating layer, said glass comprising glass modifier in a concentration of between about 33.3 and about 44 bond percent, said modifier including alumina and also including at least one member selected from the group consisting of cadmia and zinc oxide, said alumina being present in a concentration of between about 5 and about 24 bond percent, and substantially the remainder of said glass being glass former consisting of silica and borate, said silica being present in a concentration of between about 4 and 25 bond percent, the maximum concentration of glass modifier being 40 bond percent plus 0.16 times the bond percentage concentration of silica, whereby said glass has a controlled coefficient of thermal expansion and working temperature and an improved chemical durability.

2. An improved solid state electronic device comprising an ion-sensitive component, and a glass in sealing engagement therewith, said glass comprising glass modifier in a concentration of between about 33.3 and about 44 bond percent, said modifier including alumina and also including at least one member selected from the group consisting of cadmia and zinc oxide, said alumina being present in a concentraton of between about 5 and about 24 bond percent, and substantially the remainder of said glass being glass former consisting of silica and borate, said silica being present in a concentration of between about 4 and 25 bond percent, the maximum concentration of glass modifier being 40 bond percent plus 0.16 times the bond percentage concentration of silica, whereby said glass has a controlled coefficient of thermal expansion and working temperature and an improved chemical durability.

3. An improved solid state electronic device comprising an ion-sensitive component and a glass in sealing engagement therewith for isolating said component, said glass comprising glass modifier in a concentration of between about 33.3 and about 44 bond percent, said modifier including alumina and at least one member selected from the group consisting of zinc oxide and cadmia, and including beryllia in a concentration of up to about 19 bond percent, said alumina being present in a concentration of between about 5 and about 24 bond percent, the concentration of beryllia being not more than twice the sum of the concentrations of zinc oxide and cadmia, and substantially the remainder of said glass being glass former consisting of silica and borate, said silica being present in a concentration of between about 4 and about 25 bond percent, the maximum concentration of glass modifier being 40 bond percent plus 0.16 times the bond percentage concentration of silica, whereby said glass has a controlled coefficient of thermal expansion and working temperature and an improved chemical durability.

4. The improved device of claim 3 wherein said glass includes a total concentration of additive not in excess of about 5 bond percent, said additive being selected from the group consisting of zirconia, niobia, molybdena, tungsten oxide, yttria, lanthanum oxide, ceria, scandia, hafnia, gallia, indium oxide, titania, and mixtures thereof, and wherein said additive, exclusive of said titania, is present in a concentration not in excess of about 2 bond percent.

5. An improved solid state electronic device comprising an ion-sensitive component and a glass in sealing engagement therewith, said glass consisting essentially of alumina in a concentration of between about 8 and 16 bond percent, zinc oxide in a concentration such that the sum of the concentrations of zinc oxide and alumina is between about 33.3 and about 44 bond percent, silica in a concentration of between about 12 and 17 bond percent, and substantially the remainder borate, said composition having improved chemical durability and controlled melting point, working temperature and coefficient of thermal expansion.

6. An improved solid state electronic device comprising an ion-sensitive component and a glass in sealing engagement therewith, said glass having a low coefficient of thermal expansion, a relatively low working temperature and improved chemical durability, said glass comprising silica in a concentration of about 16.5 bond percent, borate in a concentration of about 49.5 bond percent, alumina in a concentration of about 10 bond percent, and the balance comprising zinc oxide.

7. The improved solid state electronic device of claim 6 wherein said glass includes beryllia in a concentration of up to about 6 bond percent.

8. The improved solid state electronic device of claim 6 wherein said glass includes cadmia in a concentration of up to about 4 bond percent.

9. An improved solid state electronic device comprising an ion-sensitive component and a glass in sealing engagement therewith, said glass having improved chemical durability, a low working temperature about 625° C. and a low coefficient of thermal expansion of about $45 \times 10^{-7}/°$ C. between 0° C. and 300° C., and consisting essentially of between about 4 and about 8 bond percent of silica, between about 54 and 62 bond percent of borate, between about 5 and 8 bond percent of alumina, between about 5 and about 8 bond percent of cadmia, and the balance zinc oxide.

10. An improved semiconductor device comprising a silicon semiconductor crystal having at least one P-N junction with an exposed passivated surface, electrical conductors having a coefficient of thermal expansion approaching that of said silicon crystal, said conductors being attached to said crystal on opposite sides of said junction, and a glass layer in sealing engagement with said passivated surface of said junction and said conductors, said glass layer having a coefficient of thermal expansion of about $38 \times 10^{-7}/°$ C. at 0° C.–300° C., and a working temperature of about 770° C., said glass consisting essentially of between about 22 and about 25 bond percent of silica, between about 32 and about 38 bond percent of borate, between about 16 and about 20 percent of alumina, and the balance zinc oxide.

11. An improved solid state electronic device comprising an ion-sensitive component and a glass in sealing engagement therewith, said glass having substantially improved chemical durability and a low working temperature and consisting essentially of silica in a concentration of about 16.5 bond percent, borate in a concentration of about 50 bond percent, alumina in a concentration of between 10 and about 12 bond percent, zirconia in a concentration of about 1 bond percent, titania in a concentration of about 1 bond percent and essentially the balance zinic oxide.

12. The improved solid state electronic device of claim 11 wherein said glass includes beryllia in a concentration of up to about 6 bond percent.

13. An improved semiconductor device comprising a semiconductor crystal having at least one P-J junction with an exposed passivated surface, electrical conductors attached to said crystal on opposite sides of said junction, said crystal being selected from the group consisting of germanium crystals and gallium arsenide crystals, and a glass layer in sealing engagement with said surface at said junction and with said conductors, said glass layer having a coefficient of thermal expansion about that of said crystal and a relatively low melting point of about 640° C., and consisting essentially of 16 bond percent of silica, 50 bond percent of borate, 6 to 10 bond percent of alumina, 20 to 24 bond percent of cadmia and the balance zinc oxide.

14. An improved solid state electronic device comprising an ion-sensitive component and a glass in sealing engagement therewith, said glass being formed of glass consisting essentially of between about 14 and about 16 bond percent of silica, between about 50 and about 52 bond percent of borate, the sum of the concentrations of said silica and said borate being not more than 66.5 bond percent, about 5 bond percent of alumina, between about 12 and about 18 bond percent of beryllia, and essentially the balance zinc oxide.

15. An improved zinc borate type glass for use in solid state electronic devices, said glass comprising glass modifier in a concentration of between about 33.3 and about 44 bond percent, said modifier including alumina in a concentration of between about 5 and about 24 bond percent, and at least one member selected from the group consisting of zinc oxide and cadmia, and substantially the remainder of said glass being glass former consisting of silica and borate, said silica being present in a concentration of between about 4 and about 25 bond percent, and the remainder of the glass former being borate, the maximum concentration of glass modifier being 40 bond percent plus 0.16 times the bond percentage concentration of silica, said glass having a controlled coefficient of thermal expansion and working temperature and an improved chemical durability.

16. The improved zinc borate type glass of claim 15 wherein said modifier includes beryllia in a concentration of up to about 19 bond percent, the total bond percent concentration of said beryllia being not more than twice the sum of the bond percent concentrations of said zinc oxide and said cadmia.

17. The improved zinc borate type glass of claim 15 wherein said glass includes a total concentration, not in excess of about 5 bond percent, of additive selected from the group consisting of titania, zirconia, niobia, molybdena, tungsten oxide, yttria, lanthanum oxide, ceria, scandia, hafnia, gallia, indium oxide, and mixtures thereof wherein said additive, exclusive of said titania, is present in a concentration not in excess of about 2 bond percent.

18. An improved zinc borate type glass for use in solid state electronic devices, which glass is suitable as a glaze and as tubing and has improved chemical durability and controlled working temperature and coefficient of thermal expansion, said glass consisting essentially of between about 8 and about 16 bond percent of alumina, between about 12 and about 17 bond percent of silica, zinc oxide in a concentration sufficient so that the total concentration of zinc oxide and alumina is between about 33.3 and about 44 bond percent and substantially the remainder being borate.

19. An improved zinc borate type glass for use in solid state electronic devices and having a low coefficient of thermal expansion of about $40 \times 10^{-7}/°$ C. at 0° C.–300° C., a relatively low working temperature of about 670° C. and improved chemical durability, said glass consisting essentially of about 16.5 bond percent of silica, 49.5 bond percent of borate, about 10 bond percent of alumina, the balance comprising zinc oxide.

20. The improved zinc borate type glass of claim 19 wherein said glass also includes beryllia in a concentration of up to about 6 bond percent.

21. The improved zinc borate type glass of claim 19 wherein said glass also includes cadmia in a concentration of up to about 4 bond percent.

22. An improved zinc borate type glass having a low working temperature of about 625° C., which glass consists essentially of between about 4 and about 8 bond percent of silica, between about 54 and about 62 bond percent of borate, the total concentration of said silica and said borate being between about 62 and about 66 bond percent, between about 5 and 8 bond percent of alumina, between about 5 and 8 bond percent of cadmia, and the balance consisting essentially of zinc oxide.

23. An improved zinc borate type glass having a coefficient of thermal expansion of about $38 \times 10^{-7}/°$ C. closely matching that of silicon crystals, and a working temperature of about 770° C., which glass consists essentially of between about 22 and about 25 bond percent of silica, between about 32 and about 38 bond percent of borate, between about 16 and about 20 bond percent of alumina, and essentially the balance being zinc oxide.

24. An improved zinc borate type glass having substantially improved chemical durability and a low working temperature and consisting essentially of about 16.5 bond percent of silica, and about 50 bond percent of borate, between about 10 and about 12 bond percent of alumina, about 1 bond percent of zirconia, about 1 bond percent of titania, and essentially the balance being zinc oxide.

25. The improved zinc borate type glass of claim 24 wherein said glass includes beryllia in up to about 6 bond percent concentration.

26. An improved zinc borate type glass having a coefficient of thermal expansion of about $60-62 \times 10^{-7}/°$ C. closely matching that of germanium and gallium arsenide semiconductor crystals, a low melting point of about 640° C., which glass consists essentially of about 16 bond percent of silica, about 50 bond percent of borate, between about 6 and about 10 bond percent of alumina, between about 20 and about 24 bond percent of cadmia and essentially the balance being zinc oxide.

27. An improved zinc borate type glass consisting essentially of between about 14 and about 16 bond percent of silica, between about 50 and about 52 bond percent of borate, the total concentration of silica and borate being not more than 66.5 bond percent, about 5 bond percent of alumina, between about 12 and about 18 bond percent of beryllia, and essentially the balance being zinc oxide.

28. An improved solid state electronic device comprising:
a current controlling component;
spaced electrical conductors attached to said component;
and a glass seal enclosing and spaced from said component and engaging said conductors in sealing relation,
said glass being substantially free of alkali metals and having a controlled working temperature and a controlled coefficient of thermal expansion compatible with that of said conductors, said glass comprising glass modifier in a concentration of between about 33.3 and about 44 bond percent, said modifier including alumina in a conecentration of between about 5 and about 24 bond percent, and at least one member selected from the group consisting of zinc oxide and cadmia, and substantially the remainder of said glass being glass former consisting of silica and borate, said silica being present in a concentration of between about 4 and about 25 bond percent, and the remainder of the glass former being borate, the maximum concentration of glass modifier being 40 bond percent plus 0.16 times the bond percentage concentration of silica.

29. An improved electronic device having a functional surface sensitive to alkali metal ions and including a glass in sealing engagement with at least a portion of the device, said glass comprising glass modifier in a concentration of between about 33.3 and about 44 bond percent, said modifier including alumina in a concentration of between about 5 and about 24 bond percent, and at least one member selected from the group consisting of zinc oxide and cadmia, and substantially the remainder of said glass being glass former consisting of silica and borate, said silica being present in a concentration of between about 4 and about 25 bond percent, and the remainder of the glass former being borate, the maximum concentration of glass modifier being 40 bond percent plus 0.16 times the bond percentage concentration of silica.

(References on following page)

References Cited

UNITED STATES PATENTS

| | | | |
|---|---|---|---|
| 2,506,130 | 5/1950 | Bain et al. | 317—258 |
| 3,241,010 | 3/1966 | Eddleston | 317—234 |
| 3,247,428 | 4/1966 | Perri et al. | 317—234 |
| 3,261,075 | 7/1966 | Carman | 317—234 |
| 3,271,124 | 9/1966 | Clark | 317—234 |
| 3,271,634 | 9/1966 | Heaton | 317—234 |
| 3,300,841 | 1/1967 | Fisher et al. | 317—234 X |
| 3,303,399 | 2/1967 | Hoogendoorn | 317—235 X |
| 3,310,719 | 3/1967 | Seney | 317—258 |

JOHN W. HUCKERT, *Primary Examiner.*

R. F. POLISSACK, *Assistant Examiner.*